United States Patent
Rajagiri et al.

(10) Patent No.: US 12,481,452 B2
(45) Date of Patent: Nov. 25, 2025

(54) FAST PROGRAM RECOVERY WITH REDUCED PROGRAMING DISTURBANCE IN A MEMORY DEVICE

(71) Applicant: Micron Technology, Inc., Boise, ID (US)

(72) Inventors: Avinash Rajagiri, Boise, ID (US); Ching-Huang Lu, Fremont, CA (US); Aman Gupta, Boise, ID (US); Shuji Tanaka, Kanagawa (JP); Masashi Yoshida, Kanagawa (JP); Shinji Sato, Kanagawa (JP); Yingda Dong, Los Altos, CA (US)

(73) Assignee: Micron Technology, Inc., Boise, ID (US)

( * ) Notice: Subject to any disclaimer, the term of this patent is extended or adjusted under 35 U.S.C. 154(b) by 200 days.

(21) Appl. No.: 18/224,538

(22) Filed: Jul. 20, 2023

(65) Prior Publication Data
US 2024/0028253 A1    Jan. 25, 2024

Related U.S. Application Data

(60) Provisional application No. 63/391,265, filed on Jul. 21, 2022.

(51) Int. Cl.
*G11C 16/10* (2006.01)
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| | | | |
|---|---|---|---|
| 2013/0265829 A1* | 10/2013 | Suzuki | G11C 16/3459 365/185.22 |
| 2021/0082505 A1* | 3/2021 | Suzuki | G11C 16/08 |
| 2022/0199175 A1* | 6/2022 | Lu | G11C 16/32 |

* cited by examiner

*Primary Examiner* — Min Huang
(74) *Attorney, Agent, or Firm* — Lowenstein Sandler LLP

(57) ABSTRACT

A memory device can include a memory array coupled with a control logic. The control logic initiates a program operation on the memory array, the program operation including a program phase and a program recovery phase. The control logic causes a program voltage to be applied to a selected word line during the program phase. The control logic causes a select gate drain coupled with a string of memory cells to deactivate during the program recovery phase after applying the program voltage, where the string of memory cells include a plurality of memory cells each coupled to a corresponding word line of a plurality of wordlines. The control logic causes a voltage to be applied to a select gate source coupled with the string of memory cells to activate the select gate source during the program recovery phase concurrent to causing the select gate drain to deactivate.

20 Claims, 7 Drawing Sheets

FAST PROGRAM RECOVERY WITH REDUCED PROGRAMING DISTURBANCE IN A MEMORY DEVICE

RELATED APPLICATIONS

This application claims the benefit of U.S. Provisional Patent Application No. 63/391,265, filed Jul. 21, 2022, the entire contents of which are hereby incorporated by reference herein.

TECHNICAL FIELD

Embodiments of the disclosure relate generally to memory sub-systems, and more specifically, relate to a fast program recovery with reduced programming disturbance (i.e., reduced hot-electron injections) in a memory device of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
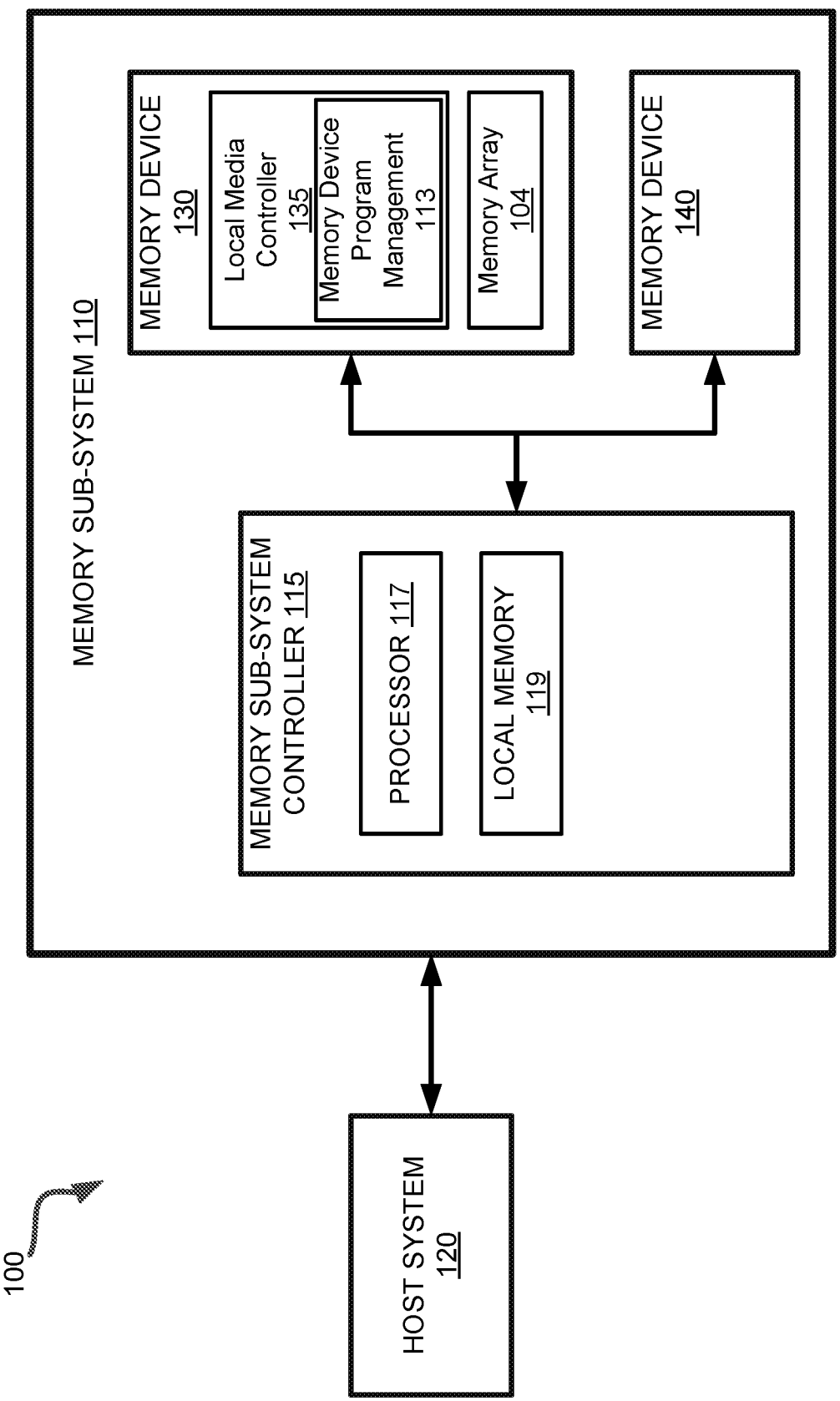
FIG. 1A illustrates an example computing system that includes a memory sub-system in accordance with some embodiments of the present disclosure.

Aspects of the present disclosure are directed to a fast program recovery with reduced programming disturbance in a memory device of a memory sub-system. For example, aspects of the present disclosure are directed to a fast program recovery phase with hot-electron mitigation. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are etched onto a silicon wafer in an array of columns (also hereinafter referred to as bit lines) and rows (also hereinafter referred to as word lines). A word line can refer to one or more rows of memory cells of a memory device that are used with one or more bit lines to generate the address of each of the memory cells. The intersection of a bit line and word line constitutes the address of the memory cell. A block hereinafter refers to a unit of the memory device used to store data and can include a group of memory cells, a word line group, a word line, or individual memory cells. One or more blocks can be grouped together to form separate partitions (e.g., planes) of the memory device in order to allow concurrent operations to take place on each plane. Each data block can include a number of sub-blocks, where each sub-block is defined by an associated pillar (e.g., a vertical conductive trace) extending from a shared bit line. Memory pages (also referred to herein as "pages") store one or more bits of binary data corresponding to data received from the host system. To achieve high density, a string of memory cells in a non-volatile memory device can be constructed to include a number of memory cells at least partially surrounding a pillar of channel material. The memory cells can be coupled to access lines, which are commonly referred to as "word lines," often fabricated in common with the memory cells, so as to form an array of strings in a block of memory. The compact nature of certain non-volatile memory devices, such as 3D flash NAND memory, means word lines are common to many memory cells within a block of memory.

During a program operation on a non-volatile memory device, certain phases can be encountered, including program, program recovery, program verify, and program verify recovery. During a programming operation, a selected memory cell(s) can be programmed with the application of a programming voltage to a selected word line. Due to the word line being common to multiple memory cells, unselected memory cells can be subject to the same programming voltage as the selected memory cell(s). If not otherwise preconditioned, the unselected memory cells can experience effects from the programming voltage on the common word line. The programming voltage effects can include the condition of charge being stored in the unselected memory cells which are expected to maintain stored data. This programming voltage effect is termed a "programming disturbance" or "program disturb" effect. Although memory cells undergoing program disturb are still apparently readable, the contents of the memory cell can be read as a data value different than the intended data value stored before application of the programming voltage.

During the program operation, relatively high voltages are applied during the program and program verify phases. Accordingly, the program recovery and program verify recovery phases allow the device to recover from the high voltage modes to discharge internal nodes, etc., and reduce programming disturbances. For example, a high program voltage can be applied during a program phase, followed by a program recovery phase where the nodes are discharged. Then a verify voltage can be applied during a program verify phase, followed by a verify recovery phase. During the recovery phases all signals on word lines are ramped down to some lower voltage level.

As word line resistances increase (e.g., due to smaller memory devices, or memory devices with additional stacked tiers), and as programming times decrease, additional programming disturbances can occur—e.g., over time additional tiers can be stacked or added in 3D NAND flash memory which can result in increased word line resistance due to reduced word line thickness. For example, the presence of residue electrons, such as electrons trapped or otherwise remaining on a charge storage structure (e.g., on the channel) after an earlier operation or phase (e.g., after a program recovery phase), can contribute to programming disturbances. At the end of a program phase, for example, a pass reset voltage (Vpass_rst) is applied to a selected word line and adjacent unselected word lines. If the word line resistance is high or the sub-phase of the program recovery during which the selected word line ramps down to a lower voltage level is too short, the voltage on the word line can fail to reach the Vpass_rst before a second sub-phase of the program recovery operation is started. Additionally, during the second sub-phase of the program recovery operation, a select gate source (e.g., SGS) and a select gate drain (e.g., SGD) can be equalized to the pass reset voltage. During the second phase, the SGD can be turned on for inhibited pillars, which can discharge the boosted channel potential onto the bit line at the drain side of the channel while the SGS can be off while ramping up to the pass reset voltage, thus not allowing source side channel potential to discharge onto the source line. This can cause a large channel potential gradient to occur in the lateral direction (e.g., along the memory pillar or channel), particularly when a word line adjacent to the selected word line on the drain side is programmed to a higher voltage level (e.g., a greater level or logic state). It should be noted, the channel potential gradient can occur in the lateral direction whether performing drain-to-source programming (e.g., higher voltage level on drain side) or source-to-drain programming (higher voltage level on source side). When the channel potential is large in the vertical and horizontal direction, electrons can be injected into the selected word line. Injected electrons can be trapped in storage nitride of array transistors connected to the word lines that have already been programmed on the drain side of the selected word line and become residue electrons. Since the channel region (i.e., the pillar) in some non-volatile memory devices is a floating channel that may not be connected to a bulk grounded body, there is generally no path for residual electrons in the channel region to discharge other than through towards the source of the memory string. These residue electrons can contribute to program disturb in a number of ways. For example, regular data word lines (i.e., word lines lower down the string) can suffer from hot-electron ("hot-e") disturb where a large voltage differential between the gate and source causes the residue electrons to be injected from a drain depletion region into the floating gate or storage node. In addition, the top few word lines in the string might suffer from insufficient boosting when the channel material of unselected memory cells is at a voltage sufficiently different than the programming voltage. This difference in voltage can initiate an electrostatic field of sufficient magnitude to change the charge on a word line and cause the contents of the memory cell to be programmed inadvertently or read incorrectly.

If the duration of the program recovery phase is long enough, the selected word line can be brought to the Vpass_rst voltage before equalization of SGS and SGD gate voltage. Subsequently, channel potential can be discharged through SGD without forming a high lateral field during program recovery. A sufficiently long discharge will tend to bring the uneven channel potential due to the residue electrons across the pillar back to a certain level (e.g., 0 volts). That is, a longer recovery time can reduce "hot-e" disturb. During this process, because the channel potential is even, electrons do not flow from the drain side of the selected word line to the selected word line. A longer program verify recovery phase, however, hurts device performance and introduces undesired latency. If the program verify recovery phase is shortened though, a larger number of residue electrons are retained (e.g., from the program recovery phase), leading to increased program disturb.

Aspects of the present disclosure address the above and other deficiencies by implementing a faster/shorter program recovery phase with specific parameters designed to reduce program disturb in a memory device of a memory sub-system. In one embodiment, the memory sub-system turns off (e.g., deactivates) a select gate drain (e.g., SGD) after a program voltage is applied during a certain interval of a program recovery phase to reduce leak of drain side boost—e.g., to ensure inhibited bit lines do not leak any charge and a horizontal or lateral channel potential electrical field is avoided. This can prevent drain side leakage from becoming hot electrons to a larger extent. In one embodiment, the memory sub-system turns on (e.g., activates) a select gate source (e.g., SGS) after a program voltage during a certain interval of the program recovery phase to help discharge source side boost—e.g., to ensure charge is also leaked off the source side and reduces the lateral or horizontal potential between the selected word line and adjacent drain side word line. In some embodiments, the SGD can be turned off and the SGS can be turned on to reduce the lateral electric field. By reducing the lateral channel potential gradient, the "hot-e" disturb can be reduced and a faster program recovery phase can be utilized. This can improve the overall program performance in the memory sub-system and mitigate the hot-electron injection phenomenon.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device 130 having control logic (e.g., local controller 135) on the die and a controller (e.g., memory sub-system controller 115) for media management within the same memory device package. An example of a managed memory device is a managed NAND (MNAND) device. Memory device 130, for example, can represent a single die having some control logic (e.g., local media controller 135) embodied thereon. In some embodiments, one or more components of memory sub-system 110 can be omitted.

In one embodiment, memory device 130 includes a memory device program management component 113 that can oversee, control, and/or manage data access operations, such as program operations, performed on a non-volatile memory device, such as memory device 130, of memory sub-system 110. A program operation, for example, can include a number of phases, such as program, program recovery, program verify, and program verify recovery. Program management component 113 is responsible for causing certain voltages to be applied (or indicating which voltages to apply) to memory device 130 during the program operation. Since relatively high voltages are applied during the program and program verify phases, the program recovery and program verify recovery phases allow the device to recover from the high voltage modes. In general, during the recovery phases all signals are ramped down to some lower voltage level. In one embodiment, program management component 113 causes a select gate drain (SGD) to turn off (e.g., deactivate) during a portion of a program recovery operation. By turning off the SGD, the memory device 130 may avoid leaking boost (e.g., voltage) from the drain side (e.g., towards adjacent drain side word lines, the next word line higher up the string (WLn+1)). This can cause a lower channel potential gradient and reduce lateral electrical fields on either side of a selected word line—e.g., reduce "hot-e" disturb. In some embodiments, program management component 113 causes a select gate source (SGS) to turn on (e.g., activate) during a portion of the program recovery operation. By turning on the SGS, the memory device 130 can leak off current on the source side (e.g., towards adjacent source side word lines, the next word lines lower down the string (WLn−1)). This can cause a lower channel potential gradient and reduce lateral electrical fields on either side of the selected word line. In some embodiments, the program management component 113 can turn off the SGD and turn on the SGS during a portion of the program recovery operation. Further details with regards to the operations of the program management component 113 are described below.

In some embodiments, the memory sub-system controller 115 includes at least a portion of program management component 113. For example, the memory sub-system controller 115 can include a processor 117 (e.g., a processing device) configured to execute instructions stored in local memory 119 for performing the operations described herein. In some embodiments, program management component 113 is part of the host system 110, an application, or an operating system. In other embodiment, local media controller 135 includes at least a portion of program management component 113 and is configured to perform the functionality described herein. In such an embodiment, program management component 113 can be implemented using hardware or as firmware, stored on memory device 130, executed by the control logic (e.g., program management component 113) to perform the operations related to program recovery described herein.

Figure 1B:
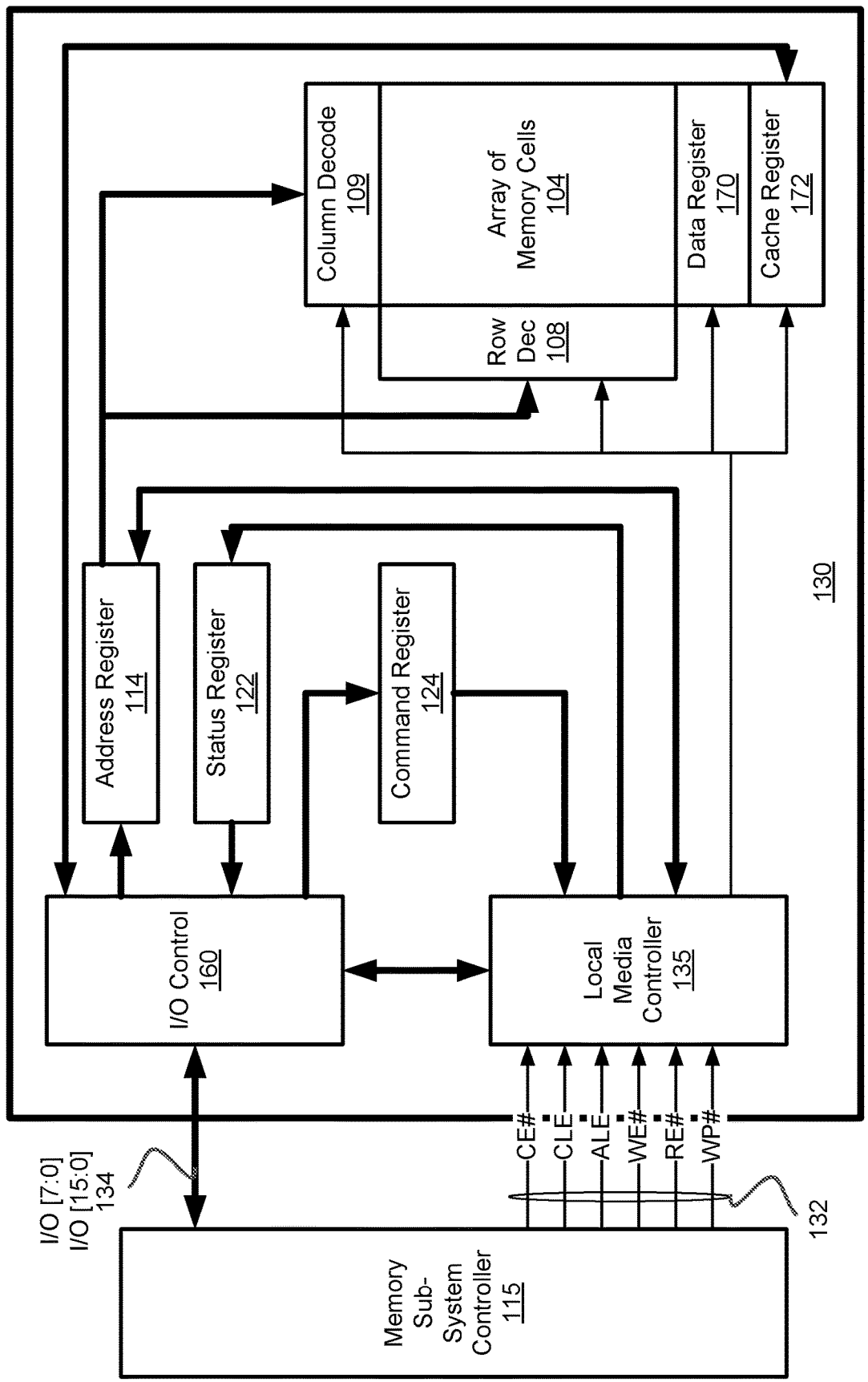
FIG. 1B is a block diagram of a memory device in communication with a memory sub-system controller of a memory sub-system, in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states. In one embodiment, the array of memory cells 104 (i.e., a "memory array") can include a number of sacrificial memory cells used to detect the occurrence of read disturb in memory device 130, as described in detail herein.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 236 and outputs data to the memory sub-system controller 115 over I/O bus 236.

For example, the commands may be received over input/output (I/O) pins [7:0] of I/O bus 236 at I/O control circuitry 160 and may then be written into command register 124. The addresses may be received over input/output (I/O) pins [7:0] of I/O bus 236 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104.

In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2:
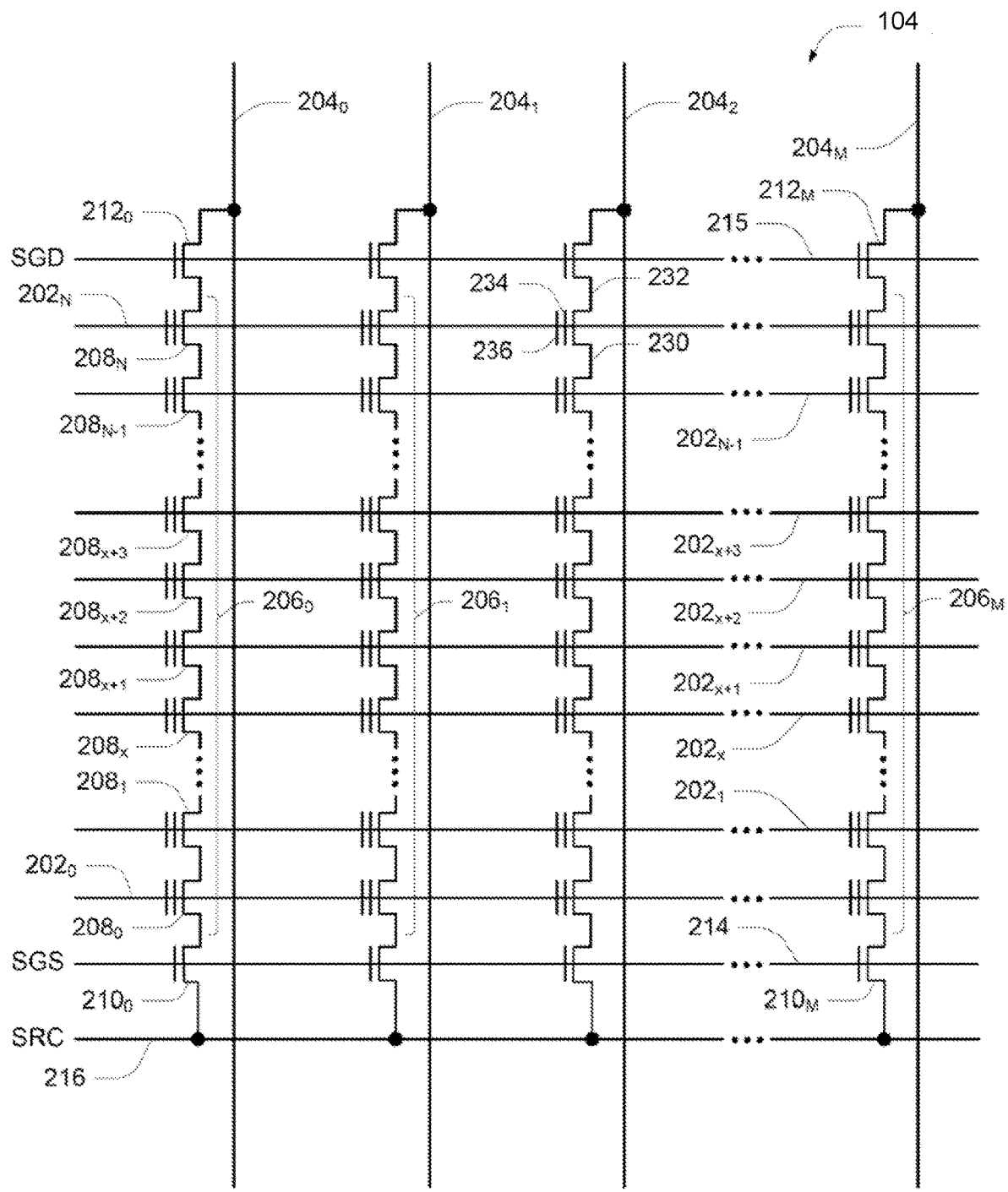
FIG. 2 is a schematic of portions of an array of memory cells as could be used in a memory of the type described with reference to FIG. 1B in accordance with some embodiments of the present disclosure.

FIG. 2 is a schematic of portions of an array of memory cells 104, such as a NAND memory array, as could be used in a memory of the type described with reference to FIG. 1B according to an embodiment. Memory array 104 includes access lines, such as wordlines $202_0$ to $202_N$, and data lines, such as bit lines $204_0$ to $204_M$. The wordlines 202 can be connected to global access lines (e.g., global wordlines), not shown in FIG. 2, in a many-to-one relationship. For some embodiments, memory array 104 can be formed over a semiconductor that, for example, can be conductively doped to have a conductivity type, such as a p-type conductivity, e.g., to form a p-well, or an n-type conductivity, e.g., to form an n-well.

Memory array 104 can be arranged in rows (each corresponding to a wordline 202) and columns (each corresponding to a bit line 204). Each column can include a string of series-connected memory cells (e.g., non-volatile memory cells), such as one of NAND strings $206_0$ to $206_M$. Each NAND string 206 can be connected (e.g., selectively connected) to a common source (SRC) 216 and can include memory cells $208_0$ to $208_N$. The memory cells 208 can represent non-volatile memory cells for storage of data. The memory cells 208 of each NAND string 206 can be connected in series between a select gate 210 (e.g., a field-effect transistor), such as one of the select gates $210_0$ to $210_M$ (e.g., that can be source select transistors, commonly referred to as select gate source), and a select gate 212 (e.g., a field-effect transistor), such as one of the select gates $212_0$ to $212_M$ (e.g., that can be drain select transistors, commonly referred to as select gate drain). Select gates $210_0$ to $210_M$ can be commonly connected to a select line 214, such as a source select line (SGS), and select gates $212_0$ to $212_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $208_0$ of the corresponding NAND string 206. For example, the drain of select gate $210_0$ can be connected to memory cell $208_0$ of the corresponding NAND string $206o$. Therefore, each select gate 210 can be configured to selectively connect a corresponding NAND string 206 to the common source 216. A control gate of each select gate 210 can be connected to the select line 214.

The drain of each select gate 212 can be connected to the bit line 204 for the corresponding NAND string 206. For example, the drain of select gate $212_0$ can be connected to the bit line $204_0$ for the corresponding NAND string $206_0$. The source of each select gate 212 can be connected to a memory cell $208_N$ of the corresponding NAND string 206. For example, the source of select gate $212_0$ can be connected to memory cell $208_N$ of the corresponding NAND string $206_0$. Therefore, each select gate 212 can be configured to selectively connect a corresponding NAND string 206 to the corresponding bit line 204. A control gate of each select gate 212 can be connected to select line 215.

In one embodiment, one or more of NAND strings 206 can be designated as sacrificial strings and used to detect read disturb in memory array 104. For example, NAND string $206_0$ can be designated a sacrificial string. In other embodiments, there can be different NAND strings or additional NAND strings, including two or more NAND strings, which are designated as sacrificial strings. In one embodiment, NAND string $206_0$ can include at least one sacrificial memory cell 208 from each wordline 202. These sacrificial memory cells 208 in the sacrificial memory string $206_0$ are not made available to the memory sub-system controller, and thus are not used to store host data. Rather, the sacrificial memory cells 208 remain in a default state (e.g., an erased state) or are programmed to a known voltage (e.g., a voltage corresponding to a known state). When a read operation is performed on any of the wordlines in memory array 104, a read voltage is applied to the selected wordline and a pass voltage is applied to the unselected wordlines, and the sacrificial memory cells will experience the same read disturb effects as the memory cells storing host data. When the read disturb effects become strong enough, one or more of the sacrificial memory cells can shift from the default or known state to a different state (e.g., to a state associated with a higher voltage level). Thus, local media controller 135 can perform a string sensing operation on the string of sacrificial memory cells to determine whether read disturb has occurred. In one embodiment, to perform the string sensing operation a predefined read voltage is applied to each wordline 202 concurrently, and the current through the sacrificial string $206_0$ is sensed. If any of the sacrificial memory cells 208 in the sacrificial string $206_0$ has shifted to a different state, the sacrificial string $206_0$ will not conduct and current will not flow. Thus, in such a situation, local media controller 135 can determine that read disturb is present in the block of memory array 104.

The memory array 104 in FIG. 2 can be a quasi-two-dimensional memory array and can have a generally planar structure, e.g., where the common source 216, NAND strings 206 and bit lines 204 extend in substantially parallel planes. Alternatively, the memory array 104 in FIG. 2 can be a three-dimensional memory array, e.g., where NAND strings 206 can extend substantially perpendicular to a plane containing the common source 216 and to a plane containing the bit lines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bit line 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $202_N$ and selectively connected to even bit lines 204 (e.g., bit lines $204_0$, $204_2$, $204_4$, etc.) can be one physical page of the memory cells 208 (e.g., even memory cells) while memory cells 208 commonly connected to wordline $202_N$ and selectively connected to odd bit lines 204 (e.g., bit lines $204_1$, $204_3$, $204_5$, etc.) can be another physical page of the memory cells 208 (e.g., odd memory cells).

Although bit lines $204_3$-$204_5$ are not explicitly depicted in FIG. 2, it is apparent from the figure that the bit lines 204 of the array of memory cells 104 can be numbered consecutively from bit line $204_0$ to bit line $204_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $202_0$-$202_N$ (e.g., all NAND strings 206 sharing common wordlines 202). Unless expressly distinguished, a reference to a page of memory cells herein refers to the memory cells of a logical page of memory cells.

Although the example of FIG. 2 is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

Figure 3:
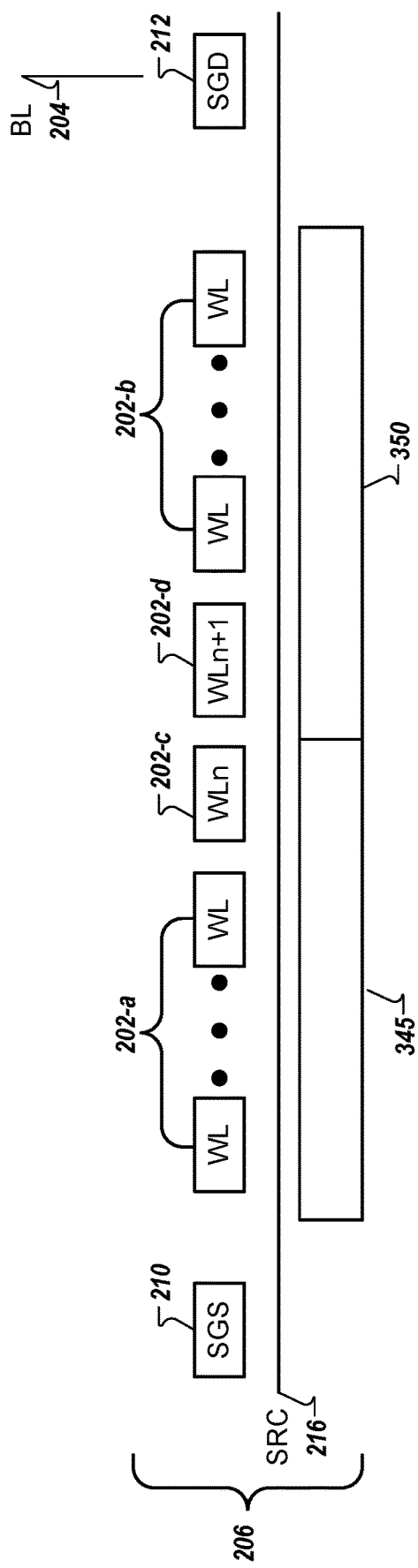
FIG. 3 is a diagram illustrating the channel potential for a string of memory cells during a program recovery phase of a program operation, in accordance with some embodiments of the present disclosure.

FIG. 3 is a diagram illustrating channel potential 300 for a string of memory cells and/or word lines during a program recovery phase of a program operation in a memory subsystem in accordance with some embodiments of the present disclosure. In one embodiment, the string 206 corresponds to string 206 illustrated in FIG. 2. As described above, the string 206 includes a drain select gate (SGD) device 212, a number of memory cells, each connected to a separate word line (WL) 202, and a source select gate (SGS) device 210. At least one of the memory cells in string 206 can be connected to a selected word line 202-$c$ (i.e., the word line being programmed (WLn)) and each remaining memory cells on the source side of the selected word line can be connected to a data word line, where word lines 202-$a$ are not programmed. Each of the remaining memory cells and adjacent word lines) on the drain side of the selected word line 202-$c$ are programmed. In some embodiments, the string 206 can be programmed from source-to-drain where word lines 202-$a$ are programmed while each remaining memory cells on the drain side of the selected word line 202-$c$ are not programmed. Depending on the embodiment, there can be any number of data word lines. In one embodiment, string 206 represents an unselected sub-block of a block of memory cells of memory device 130. As described above, the block can include additional sub-blocks having additional strings of memory cells. For example, string 206 can represent a selected sub-block of the same block, and can similarly include a number of memory cells and/or other devices which are coupled to the same word lines as the corresponding memory cells and/or other devices of string 206.

In one embodiment, string 206 can be programmed in a drain-to-source configuration. In such embodiments, the string 206 can be programmed from the select gate drain (SGD 212) to the select gate source (SGS 210)—e.g., from the top of the pillar to the bottom of the pillar. In some embodiments, one word line 202-$c$ of the word lines 202 can be a selected word line—e.g., a word line 202-$c$ associated with a program operation. In such embodiments, the memory cells associated with adjacent word line 202-$d$ and word lines 202-$b$ on a drain side of the word line 202-$c$ can already be programmed to respective logic states. Additionally, the memory cells associated with adjacent word lines 202-$a$ on a source side of the word line 202-$c$ can be unprogrammed—e.g., to be programmed in subsequent program operations. In other embodiments, the memory cells associated with adjacent word lines 202-$a$ on the source side of word line 202-$c$ can be programmed—e.g., programmed in previous program operations. Each word line 202 can be coupled with a corresponding memory cell (as illustrated in FIG. 2). In some embodiments, string 206 can include a bit line 204. The bit line 204 can be coupled with a common source 216 (SRC 216) at the source side of the string 206 as illustrated in FIG. 2. Bit line 204 can be referred to as a selected bit line 204 associated with the program operation. Additional unselected bit lines 204 can be parallel to selected bit line 204 as illustrated in FIG. 2.

As described below with respect to FIG. 4, in one embodiment, program management component 113 can cause a driver to apply different voltages to the SGS 210 and SGD 212 to activate or deactivate them, respectively, according to a defined timing sequence. For example, program management component 113 can cause different voltages to be applied to SGS 210 and SGD 212 during a program recovery phase following a program phase—e.g., following application of a program voltage to the selected word line. In at least some embodiments, selected word line 202-$c$ can have a relatively high resistance—e.g., a high resistor-capacitor (RC) time constant value. Accordingly, the selected word line 202-$c$ can take a while to transition from a program voltage utilized during the program operation to a reset voltage (Vpass_rst) during the program recovery phase.

Additionally, as a result of the program operation, there can be an electric field 345 (e.g., channel potential underneath source side word lines) on the source side of selected word line 202-$c$ and an electric field 350 (e.g., channel potential underneath drain side word lines) on the drain side of selected word line 202-$c$—e.g., along the channel. In some embodiments, the program operation can result in high boost (e.g., relatively high voltage) on the selected word line 202-$c$. If the SGD 212 is turned on while SGS 210 remains off, the boost can discharge via the drain side of the word line 202-$c$. This can result in a large channel potential gradient along the channel. That is, the electric field 350 (e.g., drain side channel potential) can be relatively small compared to electric field 345 (e.g., source side channel potential) because boost is draining from the drain side of the selected word line 202-$c$ and not from the source side of selected word line 202-$c$. In some embodiments, the channel potential gradient can be effected by a logic state of adjacent word line 202-$d$. For example, the higher the voltage level (e.g., logic state) of adjacent word line 202-$d$, the greater the channel potential gradient can be. In one embodiment, adjacent word line 202-$d$ can affect the channel potential gradient underneath the selected word line 202-$c$ most if adjacent word line 202-$d$ stores the highest logic state possible for the memory cell—e.g., the highest possible state for a triple level cell (TLC), a quadruple level cell (QLC), a quintuple level cell (PLC), etc. In some embodiments, a high channel potential along the channel can result in a "hot-e" disturb as electrons flow from the drain side of selected word line 202-$c$ into the selected word line 202-$c$.

As described below with respect to FIG. 4, during the program recovery operation, either the SGD 212 can be turned off after the program phase or SGS 210 can be turned on after the program phase or both. If SGD 212 is turned off after the program phase, electrons cannot leak to the drain side of the selected word line 202-$c$. Accordingly, the electrical field between selected word line 202-$c$ and adjacent word line 202-$d$ does not change and the channel potential gradient is relatively low. Alternatively, if SGS 210 is turned on after the program phase, electrons also leak on the source side in addition to the drain side of selected word line 202-$c$. Accordingly, the source side channel potential (e.g., which is high) can be discharged and the channel potential gradient between the selected word line 202-$c$ and adjacent word line 202-$d$ is reduced—e.g., both the source side and drain side of selected word line 202-$c$ leak boost at a similar rate. In some embodiments, during the program recovery operation, both the SGD 212 can be turned off and SGS 210 can be turned on. Accordingly, electron leaks on the source side of selected word line 202-$c$. In such embodiments, the channel potential between the selected word line 202-$c$ and the adjacent word line 202-$d$ remains the same or avoids causing an increased channel potential gradient—e.g., the electrical field between selected word line 202-$c$ and adjacent word line 202-$d$ remains constant as electrons are leaking on the source side of selected word line 202-$d$ and opposite of adjacent word line 202-*d*. By maintaining a relatively constant channel potential gradient between the selected word line 202-*c* and the adjacent word line 202-*d*, electrons do not flow into the selected word line—e.g., the "hot-e" disturb is mitigated. As a result, a faster program recovery phase can be utilized resulting in improved program performance in the memory sub-system 110.

Figure 4:
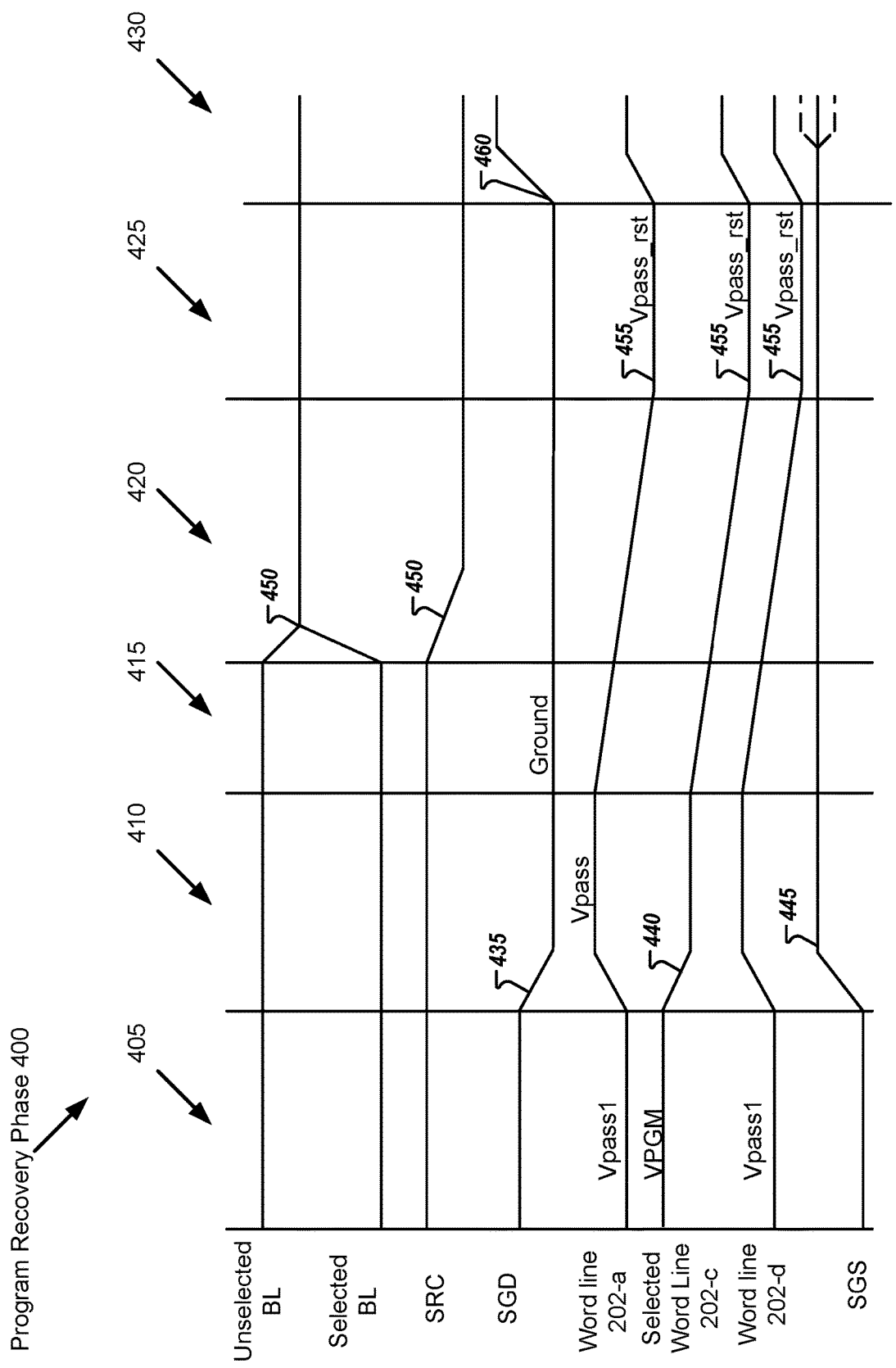
FIG. 4 is a timing diagram for operation of a memory device during a program recovery phase of a program operation, in accordance with embodiments of the present disclosure.

FIG. 4 is a timing diagram 400 for operation of a memory device during a program recovery phase of a program operation, in accordance with some embodiments of the present disclosure. During a programming operation performed on a non-volatile memory device, such as memory device 130, certain phases can be encountered, including program, program recovery, program verify, and program verify recovery. During the program phase, a program voltage or voltage is applied to selected word lines (e.g., word line 202-*c* as described with reference to FIG. 3) of the memory device 130, in order to program a certain level of charge to the selected memory cells on the word lines representative of a desired value. During the program verify phase, a read voltage is applied to the selected word lines to read the level of charge stored at the selected memory cells to confirm that the desired value was properly programmed. Since relatively high voltages are applied during the program and program verify operations, the program recovery and program verify recovery phases allow the memory device 130 to recover. Timing diagram 400 illustrates the program recovery phase, according to one embodiment. In this embodiment, the program recovery operation phase includes six (6) time intervals. In some examples, time interval 410 can be a first sub-phase (e.g., rec1) and time intervals 415, 420, and 425 can be a second sub-phase (e.g., rec2). It should be noted, each time interval is an example and is not limiting on the claims. That is, each time interval can be longer or faster than illustrated in FIG. 4 in some embodiments.

During first time interval 405, voltages at each component of the string 206 (as described with reference to FIG. 3) can be a result of finishing the program phase of the program operation—e.g., after applying a program voltage or program pulse to selected word line 202-*c*. Accordingly, the selected word line 202-*c* can be at a program voltage during time interval 405. In such embodiments, adjacent word lines 202-*a* and 202-*d* can be at a first voltage (e.g., Vpass1). SGS 210 and SGD 212 can also be at a program voltage—e.g., at a voltage bias optimized for a program phase.

During second time interval 410, program management component 113 causes a driver (e.g., word line driver) to apply a second voltage (e.g., Vpass) to word lines 202. That is, the program management component 113 causes the selected word line 202-*c* to ramp down to a lower voltage level at 440. In some embodiments, the second voltage can be greater than the first voltage (e.g., Vpass1) as illustrated in FIG. 4—e.g., the adjacent word lines 202-*a* and 202-*d* can be ramped up to a higher voltage level. In other embodiments, the second voltage can be lower than the first voltage, and adjacent word lines 202-*a* and 202-*d* can be ramped down to a lower voltage level. During the second time interval 410, program management component 113 can cause a driver to apply a ground voltage to SGD 212 at 435. That is, the program management component 113 can turn off or deactivate SGD 212. In such embodiments, the program management component 113 can cause the driver to refrain from applying a voltage SGS 210—e.g., refrain from ramping up SGS 210 at 445 to a higher voltage level. Additionally, in such embodiments, the program management component 113 can ramp up SGS 210 to a higher voltage level to turn on SGS 210 during time intervals 425 and 430 for the program verify phase.

In other embodiments, during the second time interval 410, the program management component 113 can cause the driver to apply a positive voltage to SGS 210 at 445. That is, the program management component 113 can turn on or activate SGS 210. In some embodiments, the positive voltage applied at 445 can be associated with a program verify phase for the SGS 210. In such embodiments, the program management component 113 can cause the driver to refrain from applying a ground voltage to SGD 210 at 435. Additionally, in such embodiments, the program management component 113 can cause the driver to ramp up to a higher voltage level (e.g., apply an additional voltage to) SGD 212 during time intervals 425 and 430 to ready SGD 212 for the program verify phase. In other embodiments, the positive voltage applied at 445 can be different than the voltage applied during the program verify phase for the SGS 210—e.g., the positive voltage 445 can be higher or lower than the voltage applied during the program verify for the SGS 210. In other embodiments, the program management component 113 can cause the driver to both apply a ground voltage to SGD 212 at 435 and a positive voltage to SGS 210 at 445 as illustrated in FIG. 4. As described above, by either turning on SGS 210, turning off SGD 212, or turning on SGS 210 and turning off SGD 212 after applying the program pulse (e.g., with or without delay) during the program recovery phase, the program management component 113 can prevent a large channel potential gradient to exist between the selected word line 202-*c* and adjacent word line 202-*d* and mitigate "hot-e" disturb.

During third time interval 415, the program management component 113 can cause the driver to apply a reset voltage (e.g., Vpass_rst) to the word lines 202—e.g., continue to ramp down the word lines 202 to a lower voltage level.

During fourth time interval 420, the program management component 113 can cause the driver to apply an equalization voltage (e.g., Vslot) to the unselected bit line, selected bit line 204, and the common source (SRC) at 450. While the selected bit line, unselected bit line, and SRC are equalized, the program management component 113 can cause the driver to continue applying the reset voltage to the word lines 202.

During fifth time interval 425, the word lines 202 can be at the reset voltage at 455. In embodiments where SGS 210 is turned on, the program management component 113 can cause the driver to apply an additional voltage to SGD 212 during the fifth time interval 425. In embodiments where SGD 212 is turned off, the program management component 113 can cause the driver to apply a positive voltage to SGS 210 during the fifth time interval 425 to turn on SGS 210 and cause the SGS 210 to go to the reset voltage (e.g., Vpass_rst) and apply an additional voltage to SGS 210 during the sixth time interval 430 and cause the SGS 210 to go to a program verify bias for the program verify phase.

During the sixth time interval 430, the program management component 113 can ramp up voltages to get the string 206 ready for a program verify phase. For example, the program management component 113 can cause the driver to apply the program verify voltage corresponding to the SGD 212 at 460. The program management component 113 can cause the driver to apply a read voltage associated with the program verify phase to word lines 202. If the SGS 212 is off during the initial time intervals, the program management component 113 can apply a program verify voltage corresponding to the SGS 212 during the sixth phase 430. By ensuring the boost does not leak and create a high lateral channel potential gradient, the program management component 113 can utilize a faster program recovery phase and improve the program performance in the memory sub-system 110.

Figure 5:
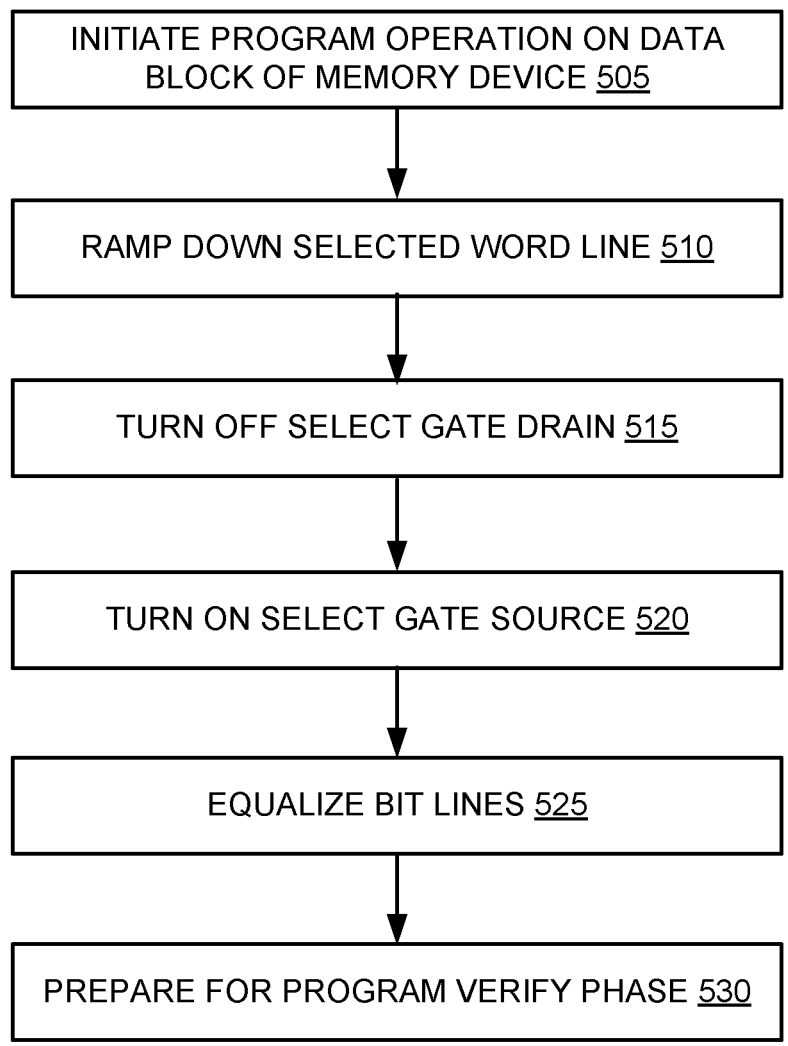
FIG. 5 is a flow diagram of an example method of implementing a fast program recovery phase with reduced programming disturbance and hot-electron mitigation in a memory sub-system, in accordance with some embodiments of the present disclosure.

FIG. 5 is a flow diagram of an example method for a fast program recovery with reduced programming disturbance in a memory sub-system the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by local media controller 135 or program management component 113 of FIG. 1A and FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, a program operation is initiated. For example, the processing logic (e.g., program management component 113) initiates a program operation on a memory device 130 or a memory array. In one embodiment, the program operation can include a program phase, a program recovery phase, a program verify phase, and a program verify recovery phase, performed in that order. In certain embodiments, each of these phases can be repeated numerous times in a cycle during a single programming operation. During the program phase, a program voltage or pulse is applied to selected word lines of the memory device 130, in order to program a certain level of charge to the selected memory cells on the word lines representative of a desired value. After finishing the program operation (e.g., programming the certain level of charge to the selected memory cells on the word lines representative of the desired value) the processing device can initiate recovery events for program operation biases—e.g., initiate the program recovery phase and then initiate the program verify and program verify recovery phase. During the program verify phase, a read voltage is applied to the selected word lines to read the level of charge stored at the selected memory cells to confirm that the desired value was properly programmed. Since relatively high voltages are applied during the program and program verify operations, the program recovery and program verify recovery phases allow the memory device 130 to recover. The memory device 130 also includes additional unselected word lines that are adjacent to the selected word line on a source side and a drain side from the selected word line.

At operation 510, a voltage at the selected word line is ramped down. For example, the processing logic causes the selected word line to ramp down to lower voltage levels. In one embodiment, the processing logic can apply an intermediate voltage (e.g., Vpass as described with reference to FIGS. 3 and 4) to the selected word line to decrease the voltage at the word line from the program voltage to the intermediate voltage. In some embodiments, the processing logic can apply a reset voltage to the selected word line after applying the intermediate voltage. By applying the reset voltage, the processing logic can help memory device 130 to recover from the program phase. In at least one embodiment, the processing logic can ramp down the selected word line while the select gate drain is off, the select gate source is on, or a combination thereof.

At operation 515, a select gate device is deactivated. For example, after the program recovery phase, the processing logic causes a ground voltage to be applied to a select gate drain (SGD) that is coupled with the selected memory cells during the recovery phase. By applying the ground voltage, the processing logic causes the select gate drain to turn off (e.g., deactivate). In some embodiments, turning off the select gate drain prevents/reduces drain side channel potential leakage.

At operation 520, a select gate device is activated. For example, the processing logic causes a voltage (e.g., a voltage associated with the program verify operation) to be applied to a select gate source (SGS) that is coupled with the selected memory cell during the recovery phase. In other embodiments, the voltage applied during operation 520 is different than a second voltage associated with the program verify phase operation for the SGS—e.g., the voltage applied during operation 520 can be higher or lower than the voltage applied during the program verify for the SGS. By applying the voltage, the processing logic causes the select gate source to turn on (e.g., activate). By turning on the select source gate, source side channel potential can discharge. In some embodiments, operation 515 can be concurrent (e.g., at least partially overlapping in time) with operation 520. That is, the processing logic can turn off the select source drain and turn on the select source gate. In some embodiments, the processing logic can perform either operation 520 or operation 515. That is, the processing logic can either turn off the select source drain or turn on the select gate source—e.g., the processing logic can cause a voltage to be applied to a select gate source coupled with the string of memory cells to activate the select gate source during the program recovery phase concurrent to causing the select gate drain to deactivate.

At operation 525, bit lines are equalized. For example, the processing logic causes an equalization voltage to be applied to all of the bit lines—e.g., both selected and unselected bit lines. For example, the processing logic can cause the selected bit line to be biased to zero (0) volts for the memory cells coupled to the selected word line that are to be programmed. In such embodiments, with the ground bias on the selected bit lines, the SGD is turned on for these memory strings/selected bit lines during the equalization. In some embodiments, the processing logic can cause a higher voltage (e.g., a VCC voltage that is higher than a ground voltage or zero (0) volts) to be applied to unselected bit lines for the memory cells coupled to the selected word line that are not to be programmed—e.g., the memory cells are inhibited. In such embodiments, the higher VCC voltage can cause the SGD to be shut off. To equalize the unselected memory strings, they are ramped down from VCC to an equalization voltage—e.g., as unselected bit lines ramp down to the equalization voltage, the SGD will turn on and allow drain side channel potential to leak off onto the bit lines. In some embodiments, the processing logic causes the equalization voltage to be applied to a common source (SRC) as described with reference to FIGS. 3 and 4. In at least one embodiment, the processing logic equalizes the bit lines and common source while the select gate drain is off, the select gate source is on, or a combination thereof.

At operation 530, the processing logic causes the memory device 130 to prepare for the program verify phase of the program operation. In one embodiment, the processing logic causes a voltage associated with the program verify phase to be applied to the select source drain—e.g., activate the select gate drain or the select gate source for the program verify phase. The processing logic can apply the voltage associated with the program verify phase to the select source drain whether or not the select source gate is on or off—e.g., whether processing logic performed operation 515, operation 520, or both operations 515 and 520. For example, the processing logic can causes a second voltage to be applied to the select gate drain to activate the select gate drain after the selected word line is at the rest voltage. In some embodiments, the processing logic can also apply a second voltage associated with the program verify phase to the select gate source e.g., in embodiments the processing logic performs operation 515 only. During operation 530, the processing logic also causes a third voltage associated with the program verify operation (e.g., a voltage associated with a read) to be applied to the selected word lines after the selected word line is at the reset voltage. That is, the processing logic can ramp up the selected word line after the selected word line is reset.

Figure 6:
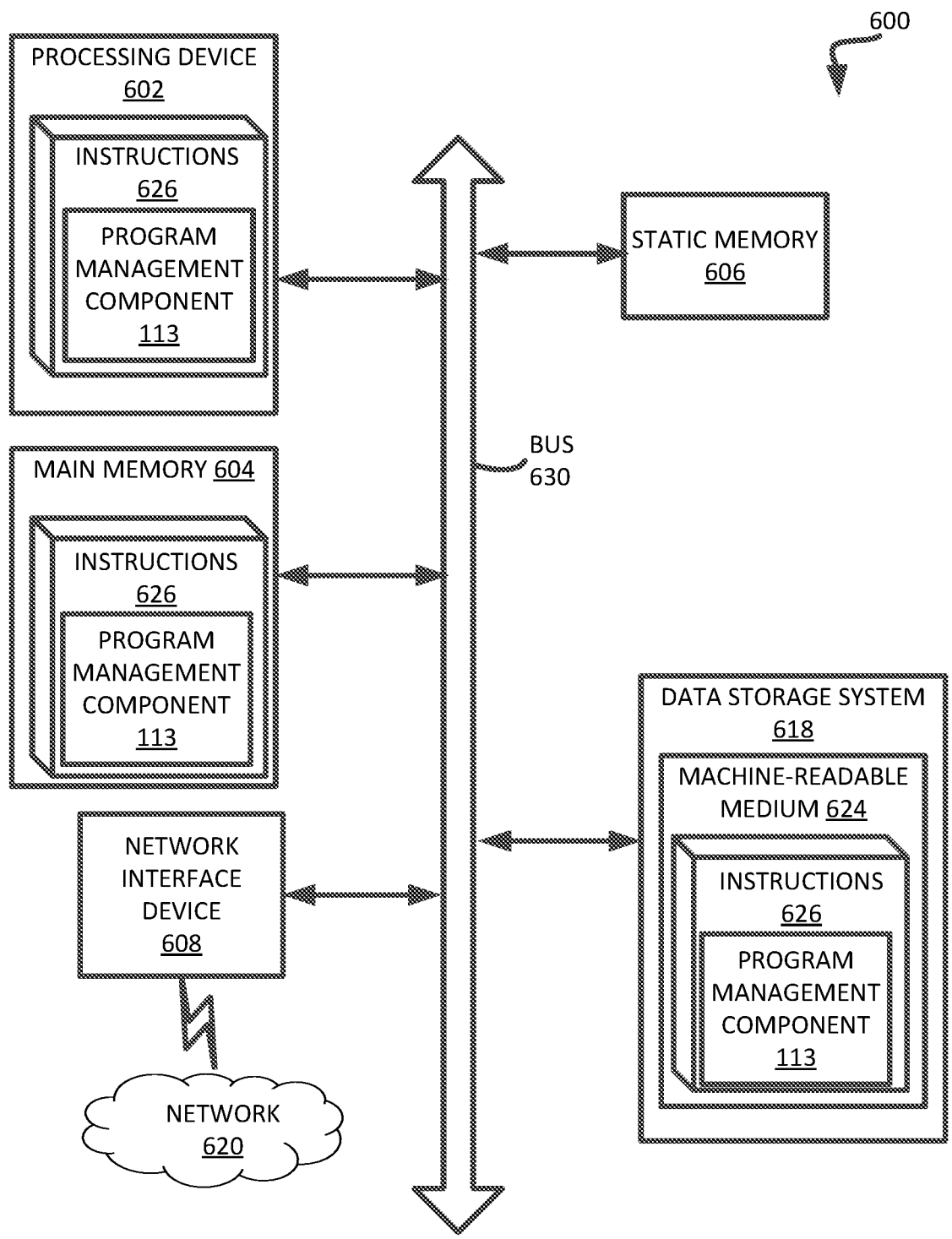
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the program management component 113 of FIG. 1 to perform a program recovery phase). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 404 can correspond to the memory sub-system 110 of FIG. 1.

In one embodiment, the instructions 626 include instructions to implement functionality corresponding to a program management component 113 to perform a program operation for the processing device 602. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
  a memory array; and
  control logic, operatively coupled with the memory array, to perform operations comprising:
    initiating a program operation on the memory array, the program operation comprising a program phase, a program recovery phase, a program verify phase, and a program verify recovery phase;
    causing a program voltage to be applied to a selected word line of the memory array during the program phase;
    causing a select gate drain coupled with a string of memory cells in the memory array to deactivate during the program recovery phase after the program voltage is applied to the selected word line, wherein the string of memory cells comprises a plurality of memory cells, and wherein each memory cell of the plurality of memory cells is coupled to a respective word line of a plurality of wordlines of the memory array;
    causing a voltage to be applied to a select gate source coupled with the string of memory cells to activate the select gate source during the program recovery phase concurrently with causing the select gate drain to deactivate; and
    causing an equalization voltage to be applied to a plurality of bit lines in the memory array to equalize the plurality of bit lines to the equalization voltage subsequent to causing the select gate drain to be deactivated and the select gate source to be activated.

2. The memory device of claim 1, wherein the control logic is to perform further operations comprising:
  causing a reset voltage to be applied to the selected word line of the plurality of word lines during at least a portion of a duration when the select gate drain is deactivated.

3. The memory device of claim 2, wherein the control logic is to perform further comprising:
  causing a second voltage to be applied to the select gate drain to activate the select gate drain after the selected word line is at the reset voltage; and
  causing a third voltage associated with the program verify operation to be applied to the selected word line after the selected word line is at the reset voltage.

4. The memory device of claim 1, wherein the voltage applied to the select gate source is associated with the program verify operation.

5. The memory device of claim 1, wherein the voltage applied to the select gate source is different than a second voltage associated with the program verify operation.

6. The memory device of claim 1, wherein
  the plurality of bit lines comprises a selected bit line associated with the program operation and one or more bit lines adjacent to the selected bit line.

7. The memory device of claim 1, wherein the plurality of word lines comprises a selected word line associated with the program operations and one or more additional word lines adjacent to the selected word line.

8. The memory device of claim 7, wherein the selected word line is coupled to a first memory cell of the plurality of memory cells in the string, and wherein at least one word line of the additional word lines adjacent to the selected word line is coupled with a second programmed memory cell on a drain-side of the first memory cell in the string of memory cells, and wherein at least one word line of the additional word lines adjacent to the selected word line is coupled with a third unprogrammed memory cell on a source-side of the first memory cell in the string of memory cells.

9. A method comprising:
  initiating a program operation on a memory device, the program operation comprising a program phase, a program recovery phase, a program verify phase, and a program verify recovery phase;
  causing a program voltage to be applied to a selected word line of the memory device during the program phase;
  causing a select gate drain coupled with a string of memory cells in a memory array of the memory device to deactivate during the program recovery phase after the program voltage is applied to the selected word line, wherein the string of memory cells comprises a plurality of memory cells, and wherein each memory cell of the plurality of memory cells is coupled to a respective word line of a plurality of wordlines of the memory array;
  causing a voltage to be applied to a select gate source coupled with the string of memory cells to activate the select gate source during the program recovery phase concurrently with causing the select gate drain to deactivate; and
  causing an equalization voltage to be applied to a plurality of bit lines in the memory array to equalize the plurality of bit lines to the equalization voltage subsequent to causing the select gate drain to be deactivated and the select gate source to be activated.

10. The method of claim 9, further comprising:
causing a reset voltage to be applied to the selected word line of the plurality of word lines during at least a portion of a duration when the select gate drain is deactivated.

11. The method of claim 10, further comprising:
causing a second voltage to be applied to the select gate drain to activate the select gate drain after the selected word line is at the reset voltage; and
causing a third voltage associated with the program verify operation to be applied to the selected word line after the selected word line is at the reset voltage.

12. The method of claim 9, wherein the voltage applied to the select gate source is associated with the program verify operation.

13. The method of claim 9, wherein the voltage applied to the select gate source is different than a second voltage associated with the program verify operation.

14. The method of claim 9, wherein
the plurality of bit lines comprises a selected bit line associated with the program operation and one or more bit lines adjacent to the selected bit line.

15. The method of claim 9, wherein the plurality of word lines comprises a selected word line associated with the program operations and one or more additional word lines adjacent to the selected word line.

16. The method of claim 15, wherein the selected word line is coupled to a first memory cell of the plurality of memory cells in the string, and wherein at least one word line of the additional word lines adjacent to the selected word line is coupled with a second programmed memory cell on a drain-side of the first memory cell in the string of memory cells, and wherein at least one word line of the additional word lines adjacent to the selected word line is coupled with a third unprogrammed memory cell on a source-side of the first memory cell in the string of memory cells.

17. A memory device comprising:
a memory array; and
control logic, operatively coupled with the memory array, to perform operations comprising:
initiating a program operation on the memory array, the program operation comprising a program phase, a program recovery phase, a program verify phase, and a program verify recovery phase;
causing a program voltage to be applied to a selected word line of the memory array during the program phase;
causing a select gate source coupled with a string of memory cells in the memory array to activate during the program recovery phase after applying the program voltage, wherein the string of memory cells comprises a plurality of memory cells, and wherein each memory cell of the plurality of memory cells is coupled to a corresponding word line of a plurality of wordlines of the memory array; and
causing an equalization voltage to be applied to a plurality of bit lines in the memory array to equalize the plurality of bit lines to the equalization voltage subsequent to causing the select gate source to be activated.

18. The memory device of claim 17, wherein the control logic to perform further operations comprising:
causing a reset voltage to be applied to the selected word line of the plurality of word lines during at least a portion of a duration when the select gate source is activated.

19. The memory device of claim 17, wherein the control logic to perform further comprising:
causing a voltage to be applied to a select gate drain coupled with the string of memory cells to deactivate the select gate drain during the program recovery phase concurrent to causing the select gate source to activate.

20. The memory device of claim 17, wherein the voltage applied to the select gate source is associated with the program verify operation.

* * * * *